US012593268B2

(12) United States Patent
Kumar et al.

(10) Patent No.: US 12,593,268 B2
(45) Date of Patent: Mar. 31, 2026

(54) METHOD AND APPARATUS FOR HANDLING PLMN SELECTION DURING DISASTER CONDITION

(71) Applicant: Samsung Electronics Co., Ltd., Suwon-si (KR)

(72) Inventors: Lalith Kumar, Bangalore (IN); Kailash Kumar Jha, Bangalore (IN); Samiran Bhowmik, Bangalore (IN); Aman Agarwal, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 17/741,971

(22) Filed: May 11, 2022

(65) Prior Publication Data

US 2022/0369217 A1 Nov. 17, 2022

(30) Foreign Application Priority Data

May 13, 2021 (IN) .............................. 202141021577
Apr. 6, 2022 (IN) ............................. 2021 41021577

(51) Int. Cl.
*H04W 48/18* (2009.01)
*H04W 4/90* (2018.01)

(52) U.S. Cl.
CPC ............. *H04W 48/18* (2013.01); *H04W 4/90* (2018.02)

(58) Field of Classification Search
None
See application file for complete search history.

(56) References Cited

U.S. PATENT DOCUMENTS

2014/0335881 A1 11/2014 Rubin et al.
2019/0230556 A1* 7/2019 Lee ........................ H04W 28/16
2019/0268752 A1 8/2019 Buckley et al.
(Continued)

FOREIGN PATENT DOCUMENTS

CA 3 051 661 A1 12/2013
WO 2020/218764 A1 10/2020
WO 2021/007447 A1 1/2021

OTHER PUBLICATIONS

C1-210115_3GPP TSG-CT WG1 Meeting #127bis-e_25-29 Jan. 2021 (Year: 2021).*
(Continued)

*Primary Examiner* — Jinsong Hu
*Assistant Examiner* — Alexander J Yi
(74) *Attorney, Agent, or Firm* — Jefferson IP Law, LLP

(57) ABSTRACT

The disclosure relates to a 5$^{th}$ generation (5G) or 6$^{th}$ generation (6G) communication system for supporting a higher data transmission rate. A method performed by a user equipment (UE) in a wireless communication system is provided. The method includes, at switch-on or recovery from a lack of a coverage, identifying that a registered public land mobile network (PLMN) is a PLMN with which the UE is registered for a disaster roaming, and performing a PLMN selection procedure, based on the identification, wherein the registered PLMN is ignored during the PLMN selection procedure.

10 Claims, 6 Drawing Sheets

(56)           References Cited

U.S. PATENT DOCUMENTS

2021/0051466  A1       2/2021   Kumar et al.

OTHER PUBLICATIONS

C1-210116_3GPP TSG-CT WG1 Meeting #127bis-e_25-29 Jan. 2021 (Year: 2021).*
C1-210012_3GPP TSG-CT WG1 Meeting #127bis-e_25-29 Jan. 2021 (Year: 2021).*
C1-210918_3GPP TSG-CT WG1 Meeting #128-e_25 Feb.-Mar. 5, 2021 (Year: 2021).*
ETSI TS 124 501_ETSI TS 124 501 V16.8.0_pub.date Apr. 2021 (Year: 2021).*
Qualcomm Incorporated, 'Solution to Mint Key Issue #5 (PLMN selection when a "Disaster Condition" applies)', C1-210115, 3GPP TSG CT WG1 Meeting #127bis-e, E-Meeting, Jan. 18, 2021.
Qualcomm Incorporated, 'Solution to Mint Key Issue #7 (Prevention of signalling overload in PLMNs without Disaster Condition)—

Alternative 1 : providing disaster roaming assistance information to distribute roamers, and congestion mitigation', C1-210116, 3GPP TSG CT WG1 Meeting #127bis-e, EMeeting, Jan. 18, 2021.
International Search Report dated Aug. 12, 2022, issued in International Patent Application No. PCT/KR2022/006711.
"3rd Generation Partnership Project; Technical Specification Group Core Network and Terminals; Study on the support for minimization of service interruption; (Release 17)", 3GPP TR 24.811 V1.1.0, May 6, 2021, pp. 1-99, XP052000960.
Vivo, "Mint: Updates to sol#21", 3GPP Draft; C1-210918, 3GPP TSG-CT WG1 Meeting #128-e, Feb. 18, 2021, XP051976528.
LG Electronics, "Key Issues for FS_MINT-CT", 3GPP Draft; C1-207310, 3GPP TSG CT WG1 Meeting #127-e, Nov. 6, 2020, XP051951850.
Extended European Search Report dated Jul. 22, 2024, issued in European Patent Application No. 22807815.0.
Indian Office Action dated Feb. 14, 2023, issued in Indian Patent Application No. 202141021577.

* cited by examiner

Figure 2:
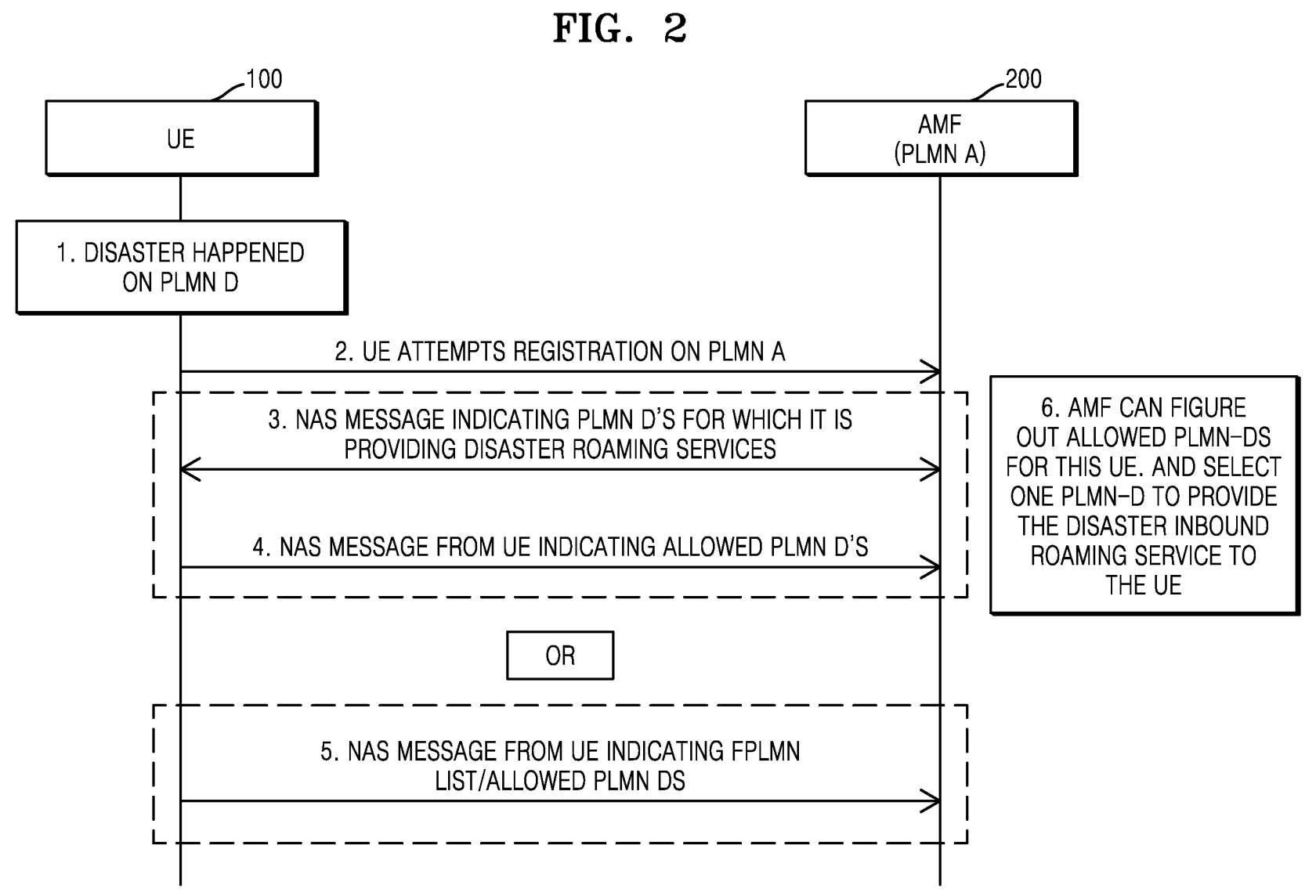

AMF (PLMN A) 200

1. DISASTER HAPPENED ON PLMN D

2. UE ATTEMPTS REGISTRATION ON PLMN A

3. NAS MESSAGE INDICATING PLMN D'S FOR WHICH IT IS PROVIDING DISASTER ROAMING SERVICES

4. NAS MESSAGE FROM UE INDICATING ALLOWED PLMN D'S

OR

5. NAS MESSAGE FROM UE INDICATING FPLMN LIST/ALLOWED PLMN DS

6. AMF CAN FIGURE OUT ALLOWED PLMN-DS FOR THIS UE. AND SELECT ONE PLMN-D TO PROVIDE THE DISASTER INBOUND ROAMING SERVICE TO THE UE

FIG. 4

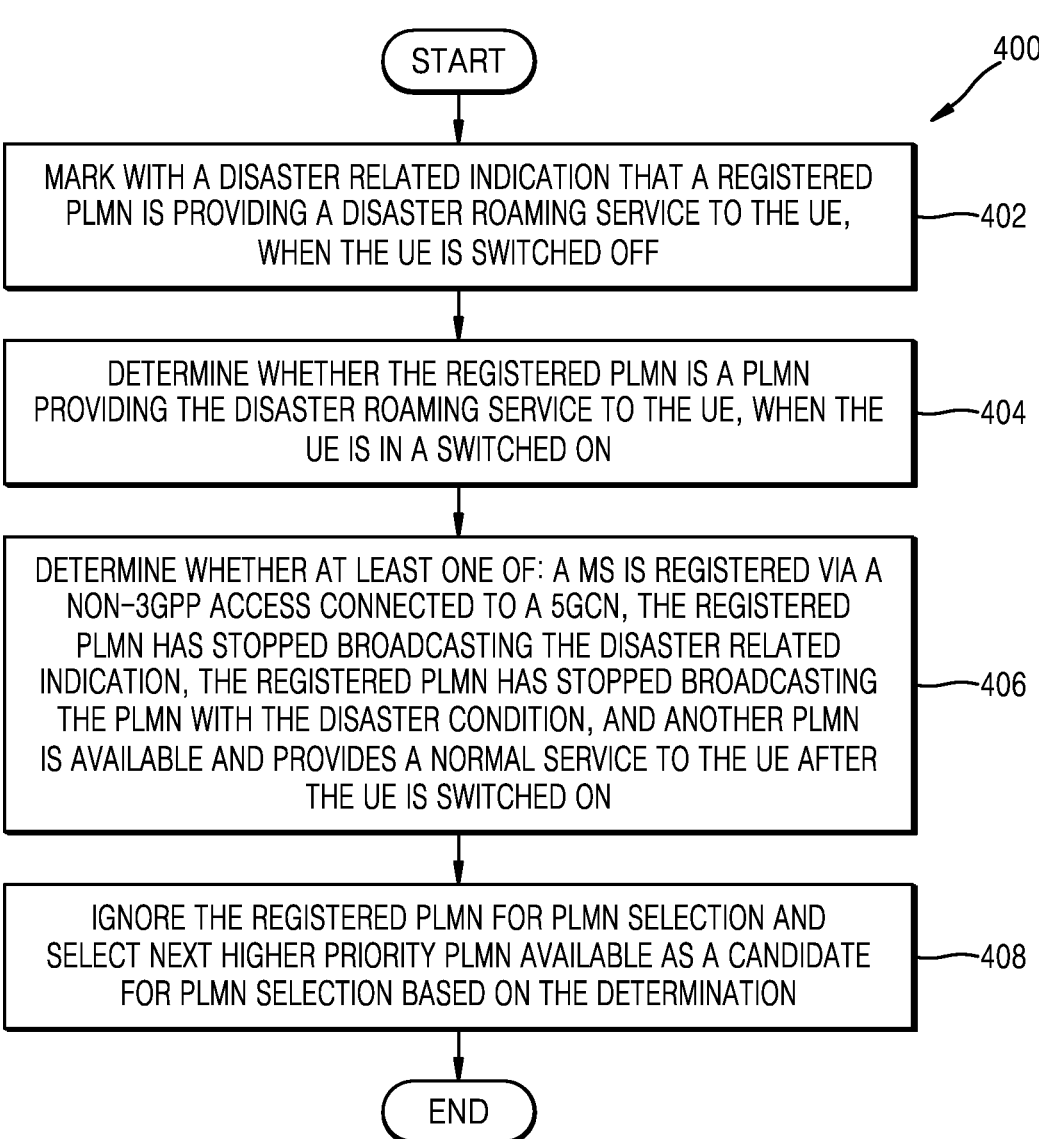

START

400

MARK WITH A DISASTER RELATED INDICATION THAT A REGISTERED PLMN IS PROVIDING A DISASTER ROAMING SERVICE TO THE UE, WHEN THE UE IS SWITCHED OFF — 402

DETERMINE WHETHER THE REGISTERED PLMN IS A PLMN PROVIDING THE DISASTER ROAMING SERVICE TO THE UE, WHEN THE UE IS IN A SWITCHED ON — 404

DETERMINE WHETHER AT LEAST ONE OF: A MS IS REGISTERED VIA A NON-3GPP ACCESS CONNECTED TO A 5GCN, THE REGISTERED PLMN HAS STOPPED BROADCASTING THE DISASTER RELATED INDICATION, THE REGISTERED PLMN HAS STOPPED BROADCASTING THE PLMN WITH THE DISASTER CONDITION, AND ANOTHER PLMN IS AVAILABLE AND PROVIDES A NORMAL SERVICE TO THE UE AFTER THE UE IS SWITCHED ON — 406

IGNORE THE REGISTERED PLMN FOR PLMN SELECTION AND SELECT NEXT HIGHER PRIORITY PLMN AVAILABLE AS A CANDIDATE FOR PLMN SELECTION BASED ON THE DETERMINATION — 408

END

FIG. 5

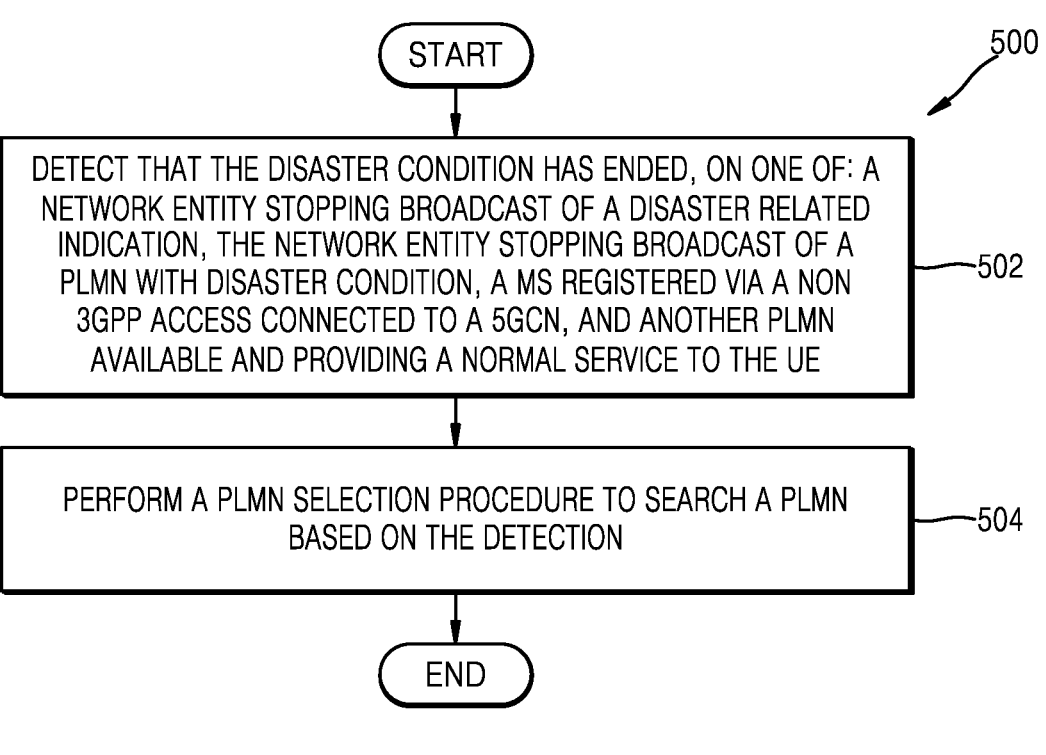

START

500

DETECT THAT THE DISASTER CONDITION HAS ENDED, ON ONE OF: A NETWORK ENTITY STOPPING BROADCAST OF A DISASTER RELATED INDICATION, THE NETWORK ENTITY STOPPING BROADCAST OF A PLMN WITH DISASTER CONDITION, A MS REGISTERED VIA A NON 3GPP ACCESS CONNECTED TO A 5GCN, AND ANOTHER PLMN AVAILABLE AND PROVIDING A NORMAL SERVICE TO THE UE

502

PERFORM A PLMN SELECTION PROCEDURE TO SEARCH A PLMN BASED ON THE DETECTION

504

END

FIG. 6

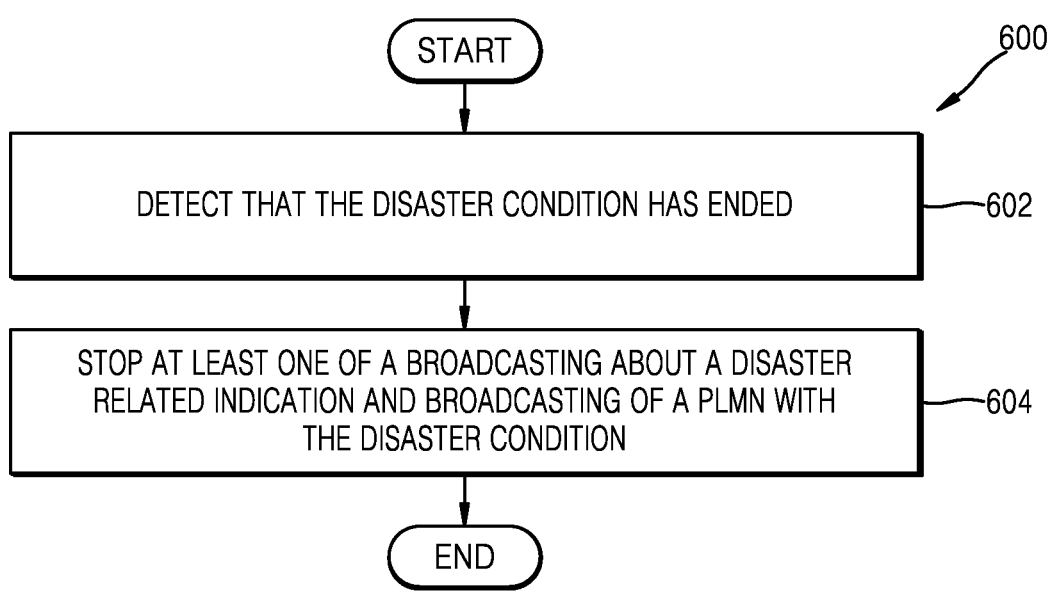

START

600

DETECT THAT THE DISASTER CONDITION HAS ENDED

602

STOP AT LEAST ONE OF A BROADCASTING ABOUT A DISASTER RELATED INDICATION AND BROADCASTING OF A PLMN WITH THE DISASTER CONDITION

604

END

METHOD AND APPARATUS FOR HANDLING PLMN SELECTION DURING DISASTER CONDITION

CROSS-REFERENCE TO RELATED APPLICATION(S)

This application is based on and claims priority under 35 U.S.C. § 119(a) of an Indian Provisional patent application number 202141021577, filed on May 13, 2021, in the Indian Intellectual Property Office, and of an Indian Complete patent application number 202141021577, filed on Apr. 6, 2022, in the Indian Intellectual Property Office, the disclosure of each of which is incorporated by reference herein in its entirety.

BACKGROUND

1. Field

The disclosure relates to a wireless network. More particularly, the disclosure relates to methods, a user equipment (UE) and a network entity for handling Public Land Mobile Network (PLMN) selection during a disaster condition in the wireless network.

2. Description of Related Art

5ᵗʰ Generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6ᵗʰ Generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step Random Access Channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a user equipment (UE) and a network entity for handling Public Land Mobile Network (PLMN) selection during a disaster condition in the wireless network.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes at switch-on or recovery from a lack of a coverage, identifying that a registered public land mobile network (PLMN) is a PLMN with which the UE is registered for a disaster roaming, and performing a PLMN selection procedure, based on the identification, wherein the registered PLMN is ignored during the PLMN selection procedure.

In accordance with another aspect of the disclosure, a user equipment (UE) in a wireless communication system is provided. The UE includes a transceiver, and at least one processor coupled to the transceiver and configured to at switch-on or recovery from a lack of a coverage, identify that a registered public land mobile network (PLMN) is a PLMN with which the UE is registered for a disaster roaming, and perform a PLMN selection procedure, based on the identification, wherein the registered PLMN is ignored during the PLMN selection procedure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 depicts a scenario in which the AMF of PLMN A will query a UE in order to know disaster PLMN corresponding to that particular UE, according to an embodiment of the disclosure;

FIGS. 4 and 5 are flowcharts illustrating a method, implemented by the UE, for handling PLMN selection during a disaster condition, according to various embodiments of the disclosure;

FIG. 6 is a flowchart illustrating a method, implemented by the network entity, for handling PLMN selection during a disaster condition, according to an embodiment of the disclosure;

Throughout the drawings, it should be noted that like reference numbers are used to depict the same or similar elements, features, and structures.

DETAILED DESCRIPTION

Figure 1:
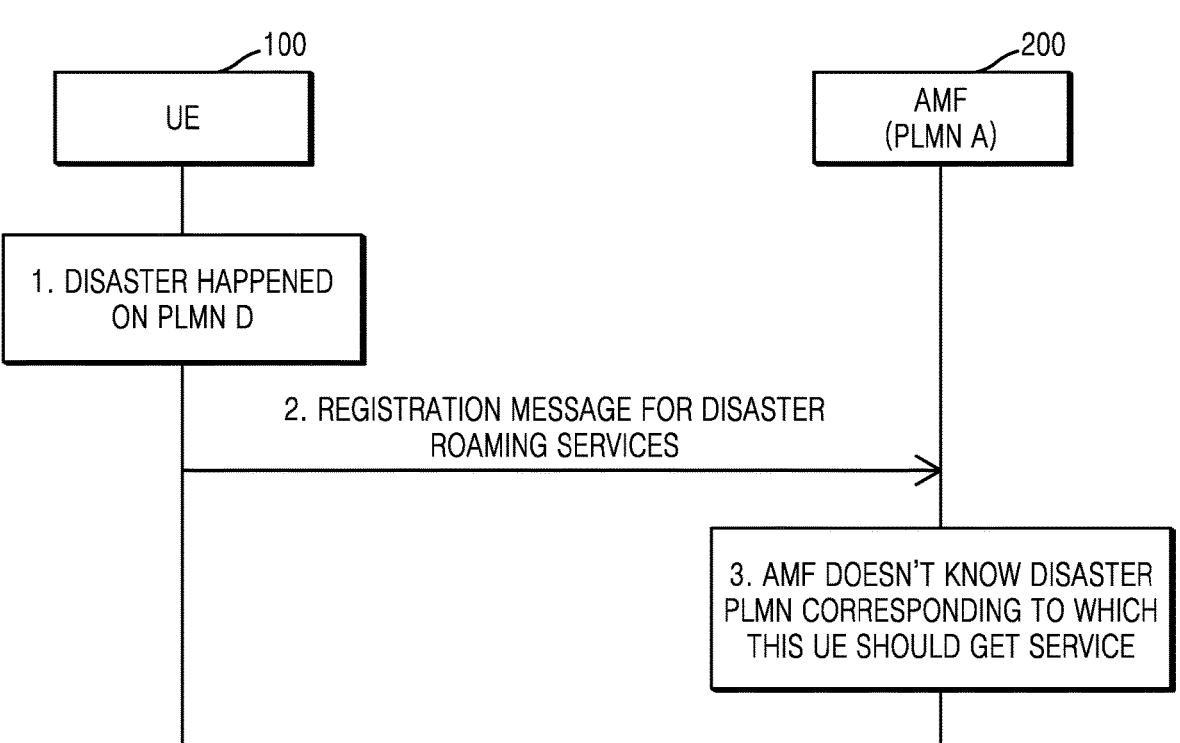
FIG. 1 depicts a scenario, wherein an Access and Mobility Management Function (AMF) of PLMN A does not know for which a disaster PLMN and a UE is trying to get disaster roaming services according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS)

described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

The purpose of a minimization of service interruption (MINT) is to minimize interruption of service to users when a wireless network to which these users are subscribed cannot provide a service due to a disaster such as e.g., a fire, earthquake or the like by enabling the users to obtain the service on other networks, while at the same time protecting those other networks from congestion.

Consider that the PLMN D is subject to disaster and PLMN A is alive and not subject to disaster. This is applicable regardless whether PLMN D is a home PLMN (HPLMN) or any other PLMN. If the UE determines that PLMN D has "Disaster Condition", the UE determines that PLMN A can accept "Disaster Inbound Roamers" from the PLMN D. If PLMN D is not in the UE's list of forbidden PLMNs and PLMN A is in the UE's list of forbidden PLMNs, then in automatic PLMN selection, the UE considers the PLMN A as allowable PLMN with lowest priority (despite PLMN A being in UE's list of forbidden PLMNs).

The terms disaster based service and disaster roaming service have used interchangeably herein in the patent disclosure and have the same meaning.

It is possible that PLMN A is providing disaster roaming services for multiple disaster PLMNs (PLMN D1, PLMN D2, PLMN D3). The UE performs registration for disaster inbound roaming; i.e., the UE indicates this in the registration message. If PLMN-A AMF is having multiple agreements with PLMN-Ds; i.e., it is providing disaster inbound roaming service on behalf of multiple PLMN-Ds, it is not clear which PLMN-D will be selected by PLMN-A to provide service to the UE. For PLMN-A, it might not be possible to determine whether the UE wants disaster roaming services for PLMN D1 or PLMN D2 (in a case when both PLMN D1 and D2 are allowed PLMN's for UE). The network may apply differential treatment for the UE's belonging to different disaster PLMNs (PLMN D1, PLMN D2, PLMN D3) with respect to charging or return of the UE's to their respective PLMN's after disaster condition has ended. Also, disaster roaming services allowed for the UE's belonging to different disaster PLMN's might be different. Further, how to authenticate the UE if there is no roaming agreement between PLMN-A and HPLMN of the UE.

FIG. 1 depicts a scenario, wherein the AMF (200) of PLMN A does not know for which disaster PLMN, the UE (100) is trying to get disaster roaming services according to an embodiment of the disclosure. Here, PLMN D is subject to disaster and PLMN A is alive and not subject to disaster and providing disaster roaming services for multiple disaster PLMN's.

Referring to FIG. 1, at operation 1, the UE (100) detects that the disaster is happened on the PLMN D. At step 2, the UE (100) sends the registration message for the disaster roaming services to the AMF (200). At step 3, the AMF (200) doesn't know disaster PLMN corresponding to which the UE (100) should get service.

Further, 1) the UE (100) is registered for disaster roaming service on PLMN-A (PLMN providing disaster roaming service on behalf of PLMN-D) because PLMN-D (PLMN with disaster condition) has faced a disaster. Thus, registered PLMN (RPLMN) of the UE (100) is PLMN-A. After switch off and switch on procedure, the UE (100) first attempts on the RPLMN because this is last PLMN where UE context is stored. The UE (100) may already have the frequency on which the RPLMN is available thus search is easy and quick. Hence, the UE (100) can get into service quickly. However, when switch ON is done, if condition to receive disaster situation is not same then the UE (100) selecting RPLMN and registering may not be useful. Even if the UE (100) attempts registration on PLMN-A there are two possible issues:

If PLMN-A operator is aware that disaster situation has ended on PLMN-D, the UE (100) may get rejected with PLMN-A, thus the UE (100) is then forced to select some other PLMN, camping and getting into the service is delayed for the UE (100). Also, there is an unnecessary signaling message exchanged between UE (100) and the network impacting the signaling on the network and the battery for the UE (100).

Second possibility is that the disaster situation is continued on PLMN-D when the UE (100) does switch ON. In this case, PLMN-A would not reject the UE (100). But if UE (100) is able to receive normal service over non-3GPP access, accessing and attempting to receive disaster roaming services will be a costly affair to the user. The UE (100) will not get all the required services during disaster roaming and HPLMN will have to pay to the forbidden PLMN high price unnecessarily.

It is desired to address the above mentioned disadvantages or other short comings or at least provide a useful alternative.

The principal aspect of the embodiments herein is to disclose methods and systems handling PLMN selection during a disaster condition. The proposed method can be used to ignore the RPLMN and quick search of PLMN with the disaster condition with a low cost manner. The proposed method improves the resource usage and the battery life for the UE.

Accordingly, the embodiments herein provide methods for handling PLMN selection during a disaster condition. The method includes marking, by a UE, with a disaster related indication that a registered PLMN is providing a disaster roaming service to the UE, when the UE is switched OFF. Further, the method includes determining, by the UE, whether the registered PLMN is a PLMN providing the disaster roaming service to the UE, when the UE is switched ON. The method includes determining, by the UE, at least one of: a mobile station (MS) is registered via a non-3rd Generation Partnership Project (3GPP) access connected to a fifth generation core network (5GCN), the registered PLMN has stopped broadcasting the disaster related indication, the registered PLMN has stopped broadcasting a PLMN with the disaster condition, and another PLMN is available and provides a normal service to the UE, i.e., there is another PLMN which is not part of the list of forbidden PLMNS of the UE, after the UE is switched ON; and ignoring, by the UE, the registered PLMN for PLMN selection and selecting next higher priority PLMN available as a candidate for PLMN selection based on the determination.

Accordingly, the embodiments herein provide methods for handling a PLMN selection during a disaster condition. The method includes detecting, by a UE, that the disaster condition has ended, based on one of a network entity stopping broadcast of a disaster related indication, the network entity stopping broadcast of a PLMN with disaster condition, a MS registered via a non-3GPP access connected to a 5GCN, and another PLMN available and providing a normal service to the UE i.e., there is another PLMN which is not part of the list of forbidden PLMNS of the UE. The method includes performing, by the UE, a PLMN selection procedure to search/select a PLMN based on the detection.

Accordingly, the embodiments herein provide methods for handling a PLMN selection during a disaster condition. The method includes detecting, by a network entity, that the disaster condition has ended. Further, the method includes stopping, by the network entity, at least one of a broadcasting about a disaster related indication and broadcasting of a PLMN with the disaster condition.

Accordingly, the embodiments herein provide a UE for handling PLMN selection during a disaster condition. The UE includes a disaster condition handling controller coupled with a processor and a memory. The disaster condition handling controller is configured to mark with a disaster related indication that a registered PLMN is providing a disaster roaming service to the UE, when the UE is switched OFF. The disaster condition handling controller is configured to determine whether the registered PLMN is a PLMN providing the disaster roaming service to the UE, when the UE is switched ON. The disaster condition handling controller is configured to determine at least one of: a MS is registered via a non-3GPP access connected to a 5GCN, the registered PLMN has stopped broadcasting the disaster related indication, the registered PLMN has stopped broadcasting the PLMN with the disaster condition, and another PLMN is available and provides a normal service to the UE after the UE is switched ON. Further, the disaster condition handling controller is configured to ignore the registered PLMN for PLMN selection and select next higher priority PLMN available as a candidate for PLMN selection based on the determination.

Accordingly, the embodiments herein provide a UE for handling a PLMN selection during a disaster condition. The UE includes a disaster condition handling controller coupled with a processor and a memory. The disaster condition handling controller is configured to detect that the disaster condition has ended, based on one of: a network entity stopping broadcast of a disaster related indication, the network entity stopping broadcast of a PLMN with disaster condition, a MS registered via a non-3GPP access connected to a 5GCN, and another PLMN available and providing a normal service to the UE. The disaster condition handling controller is configured to perform a PLMN selection procedure to search a PLMN based on the detection.

Accordingly, the embodiments herein provide a network entity for handling a PLMN selection during a disaster condition. The network entity includes a disaster condition handling controller coupled with a processor and a memory. The disaster condition handling controller is configured to detect that the disaster condition has ended. Further, the disaster condition handling controller is configured to stop at least one of a broadcasting about a disaster related indication and broadcasting of a PLMN with the disaster condition.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for handling PLMN selection during a disaster condition. The method includes marking, by a UE, with a disaster related indication that a registered PLMN is providing a disaster roaming service to the UE, when the UE is switched OFF. Further, the method includes determining, by the UE, whether the registered PLMN is a PLMN providing the disaster roaming service to the UE, when the UE is switched ON. The method includes determining, by the UE, whether at least one of: a MS is registered via a non-3GPP access connected to a 5GCN, the registered PLMN has stopped broadcasting the disaster related indication, the registered PLMN has stopped broadcasting the PLMN with the disaster condition, and another PLMN is available and provides a normal service to the UE after the UE is switched ON; and ignoring, by the UE, the registered PLMN for PLMN selection and selecting next higher priority PLMN available as a candidate for PLMN selection based on the determination.

The proposed method can be used to ignore the RPLMN and quick search of PLMN with the disaster condition with a low cost manner. The proposed method improves the resource usage and the battery life for the UE.

The methods can be used for enabling PLMN A to determine the disaster PLMN for UE (assuming PLMN A is providing disaster inbound roaming services for multiple disaster PLMN's), when a UE identifies that a disaster situation has occurred or disaster condition applies for a PLMN (PLMN D1) and the UE initiates registration on a PLMN A for disaster roaming services.

The methods can be used for changing the Registered PLMN (RPLMN) at switch-on or following recovery from lack of coverage, if the registered PLMN was providing disaster roaming service to the UE before switch-off or before lack of coverage.

The methods can be used for enabling a UE to do a PLMN search immediately, wherein a UE, which is in IDLE/INACTIVE state, determines that PLMN A has stopped broadcasting disaster roaming support.

Referring now to the drawings, and more particularly to FIGS. 2 to 6 where similar reference characters denote corresponding features consistently throughout the figures, there are shown at least one embodiment.

FIG. 2 depicts a scenario, wherein the AMF (200) of PLMN A will query the UE (100) in order to know disaster PLMN corresponding to that particular UE (100), according to an embodiment of the disclosure.

Referring to FIG. 2, at operation 1, the UE (100) detects that the disaster is happened on the PLMN D. At operation 2, the UE (100) attempts registration on the PLMN A. At operation 3, the AMF (200) sends the NON access stratum (NAS) message indicating the PLMN D's for which it is providing disaster roaming services. At operation 4, the UE (100) sends the NAS message indicating allowed PLMN D's to the AMF (200). At operation 5, the UE (100) sends the NAS message indicating Forbidden PLMN (FPLMN) list/allowed PLMN Ds to the AMF (200). At operation 6, the AMF (200) can figure out allowed PLMN-Ds for the UE (100) and selects one PLMN-D to provide the disaster inbound roaming service to the UE (100).

In an embodiment, when it is specified that UE (100) will indicate any information then it can be part of the NAS message which is a response NON access stratum (NAS) message of the network or the UE (100) can proactively send this information in one of the NAS messages to the network i.e. (PLMN-A).

In an embodiment, when the UE (100) identifies that the disaster situation has occurred or disaster condition applies for the PLMN (PLMN D1), and the list of PLMNs to be used while in Disaster condition includes PLMN A, then the UE (100) can register on PLMN A and get disaster roaming services on PLMN A. If the PLMN A is providing disaster roaming services for multiple PLMNs (PLMN D1, D2, D3), then it might be necessary for the AMF (200) to know which is the disaster PLMN corresponding to the UE (100) in order to apply differential disaster roaming services for different UE's.

The UE (100) provides following information to the PLMN-A as part of NAS message:

The UE (100) may send the Forbidden PLMN list/Allowable PLMN list/Operator-controlled PLMN (OPLMN)-list/User-controlled PLMN (UPLMN)-list/equivalent HPLMN (EHPLMN) list/HPLMN/registered PLMN to the PLMN A in a NAS message (optionally in response to request from network in NAS message). Using this information, the PLMN-A determines the PLMN-Ds which are not allowed (or allowed) for the UE (100). Optionally, Forbidden PLMN list/Allowable PLMN list/OPLMN-list/UPLMN-list/EHPLMN list/HPLMN/registered PLMN of the current country can be sent by the UE (100) to the PLMN-A.

The AMF (200) chooses the PLMN-Ds which are not part of the FPLMN list shared by the UE (100). If there are more than one PLMN-D, then the AMF (200) chooses (or selects) the highest priority PLMN-D indicated by the UE (100) or randomly selects one of the PLMN-D; for example, based on load conditions, congestion situation etc.

The AMF (200) may send the PLMN-D(s) to the UE (100) in a NAS message for which PLMN-A is providing disaster inbound roaming service. The UE (100) in response indicates the allowable PLMNs out of those PLMN-Ds; optionally taking into account, the stored FPLMN list in the UE (100); i.e., the UE (100) indicates the PLMN-D(s) which are not part of FPLMN list to the AMF (200). The UE (100) sends this information in the priority order of the PLMN-Ds. Optionally, this priority can be based on the priority order based on 23.122 or priority order based on 23.122 except RPLMN.

In yet another embodiment, the AMF (200) indicates the priority of disaster PLMNs to the UE (100). The UE (100) can take this into account while responding to AMF (200) in the NAS message and provide the priority preferred by the UE (100). Once the PLMN-D is determined for the UE (100), the AMF (200) can apply disaster roaming services specific for that PLMN-D to the UE (100).

In an embodiment, the methods can be used for changing (or removing or deleting or ignoring) the Registered PLMN (RPLMN) at switch-on or following recovery from lack of coverage, if the registered PLMN was providing disaster roaming service to the UE (100) before switch-off or before lack of coverage. The proposed method allows the UE (100)

to change (ignore) the Registered PLMN (RPLMN) at switch-on or following recovery from lack of coverage, if:

the Registered PLMN(RPLMN) was providing disaster roaming service to the UE (100) before switch-off or before lack of coverage; and at switch-on or following recovery from lack of coverage, either the UE (100) determines that the registered PLMN (RPLMN) is no longer providing disaster roaming service to the UE (100) (for e.g., by any broadcast information); i.e., disaster situation has been revoked; or if the UE (100) determines (for e.g., by any broadcast information) that the "Disaster Condition" no longer applies to the PLMN i.e., disaster situation has been revoked (i.e., PLMN D) for which the Registered PLMN (RPLMN) was providing disaster roaming services before switch-off or before lack of coverage.

The steps are as follows—

At switch-on or following recovery from lack of coverage, if the UE (100) determines that the Registered PLMN (RPLMN i.e., PLMN A in this case) was providing disaster roaming service to the UE (100) for any PLMN not part of UE's forbidden PLMN List (i.e., PLMN D in this case) before switch-off or before lack of coverage, the UE (100) should ignore the RPLMN (or delete the RPLMN) and consider the highest priority EHPLMN (if EHPLMN list is present and not empty) or HPLMN (if EHPLMN list is not present or if EHPLMN list is empty) or the PLMN (i.e., PLMN D) for which registered PLMN was providing the disaster roaming service and attempt registration on it if available if at switch-on or following recovery from lack of coverage, either the UE (100) determines (by any broadcast message) that the registered PLMN (RPLMN) is no longer providing disaster roaming service to the UE (100); or If the UE (100) determines (by any broadcast message) that the "Disaster Condition" no longer applies to the PLMN (i.e., PLMN D) for which the Registered PLMN (RPLMN) was providing disaster roaming services before switch-off or before lack of coverage.

If the Registered PLMN (RPLMN) is not available (or deleted due to above steps), the UE (100) should select based on "Priority order based on 23.122" or "Priority order based on 23.122 except RPLMN".

In other words, at switch-on or following recovery from lack of coverage or whenever the UE (100) is in the IDLE or RRC Inactive state, if the registered PLMN (RPLMN) is set to the PLMN (PLMN A) which is providing disaster roaming services (also called as disaster inbound roaming services) on behalf of another PLMN (PLMN D) and now disaster situation has been revoked, then the UE (100) can directly select for higher priority PLMN based on "Priority order based on 23.122" or "Priority order based on 23.122 except RPLMN".

The UE (100) determines whether the disaster situation has been revoked or removed based on one or more of the following example triggers (this should be just taken as an example events):

a) Broadcast bit of serving PLMN-A does not indicate support for disaster inbound roaming services-or-PLMN-A has stopped broadcasting PLMN-D; or b) the UE (100) finds a non-3GPP access signal. The UE (100) is able get into connected mode over a PLMN. Optionally, this PLMN is not part of forbidden PLMN list or it is a HPLMN or it is an EHPLMN. Optionally, this step is true if the registration procedure is successful over non-3GPP access. Optionally, this step is true if the UE (100) is able to find a PLMN over non-3GPP access of the current serving country (determined over 3GPP access); or c) if none of the PLMNs configured in the UE (100) are known to provide disaster inbound roaming service are available in a given area. There is at least one PLMN available in the area which is known to provide normal service to the UE (100), i.e., the PLMN is not part of list of forbidden PLMN of the UE (100).

If the registered PLMN (RPLMN) is set to the PLMN, which is providing disaster services on behalf of another PLMN, then the UE (100) can directly search for higher priority PLMN as per TS 23.122 instead of attempting registration on registered PLMN (RPLMN).

When the UE (100) receives services from registered PLMN (RPLMN), which is providing disaster roaming services on behalf of another PLMN, then UE (100) shall store/mark that PLMN and remember that this PLMN (i.e., PLMN A) is providing disaster roaming services, so that optimizations for PLMN selection/search as discussed in this embodiment can be applied. Optionally, the UE (100) can also store the respective PLMN-D.

In an embodiment, the methods can be used for enabling the UE (100) to do a PLMN search immediately. The UE (100) is in IDLE/INACTIVE state, and the UE (100) determines that PLMN A has stopped broadcasting disaster roaming support or the UE (100) determines that disaster situation has be revoked or ended as described in this embodiment earlier. For example, on determining that broadcast bit due to Disaster is disabled or the PLMN has stopped broadcasting PLMN with disaster condition or the UE (100) is able to register on non-3GPP access, the UE (100) immediately performs PLMN Selection procedure to select higher priority PLMN. The UE (100) may prioritize the PLMN D, while doing such a PLMN search, so that it can quickly acquire service on PLMN D if available. If PLMN-A AMF (200) is interested in saving the PDU sessions for session continuity, the AMF (200) can just release the UE. In this embodiment, the term "stopped broadcasting disaster roaming support" should be read as the UE (100) has determined that PLMN is not supporting disaster inbound roaming service or disaster inbound roaming service with respect to a particular PLMN-D to which UE (100) is registered.

"Priority order based on 23.122" is defined as below (as in 4.4.3.1.1 Automatic Network Selection Mode Procedure):

The MS selects and attempts registration on other PLMN/access technology combinations, if available and allowable, in the following order:

0) RPLMN.

i) Either the HPLMN (if the EHPLMN list is not present or is empty) or the highest priority EHPLMN that is available (if the EHPLMN list is present);

ii) Each PLMN/access technology combination in the "User Controlled PLMN Selector with Access Technology" data file in the a subscriber identity module (SIM) (in priority order) (UPLMN list);

iii) Each PLMN/access technology combination in the "Operator Controlled PLMN Selector with Access Technology" data file in the SIM (in priority order) or stored in the mobile equipment (ME) (in priority order) (OPLMN list);

iv) Other PLMN/access technology combinations with received high quality signal in random order;

NOTE 1: High quality signal is defined in the appropriate AS specification.

v) Other PLMN/access technology combinations in order of decreasing signal quality.
VI) FPLMN list PLMNs Priority order based on 23.122 except RPLMN is defined as below:

Follow the same order "Priority order based on 23.122", but skip RPLMN.

Figure 3A:
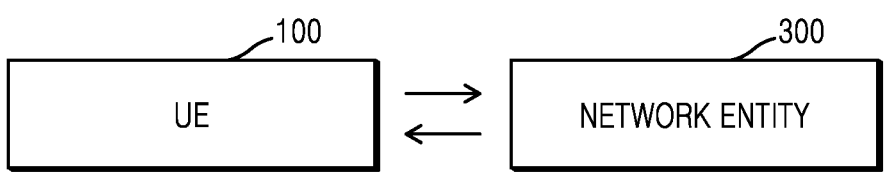
FIG. 3A illustrates an overview of a wireless network for handling Public Land Mobile Network (PLMN) selection during a disaster condition, according to an embodiment of the disclosure.

FIG. 3A illustrates an overview of a wireless network (1000) for handling PLMN selection during the disaster condition, according to an embodiment of the disclosure.

The wireless network (1000) can be, for example, but not limited to a 5G network, 6G network, an open radio access network (ORAN) network or the like. In an embodiment, the wireless network (1000) includes the UE (100) and the network entity (300). The UE (100) can be, for example, but not limited to a laptop, a desktop computer, a notebook, a Device-to-Device (D2D) device, a vehicle to everything (V2X) device, a smartphone, a foldable phone, a smart TV, a tablet, an immersive device, and an internet of things (IoT) device.

The network entity (300) is configured to detect that the disaster condition has ended and stop the broadcasting about a disaster related indication and broadcasting of the PLMN with the disaster condition.

In an embodiment, the UE (100) is configured to mark with the disaster related indication that the registered PLMN is providing the disaster roaming service to the UE (100), when the UE (100) is switched OFF. Further, the UE (100) is configured to determine whether the registered PLMN is the PLMN providing the disaster roaming service to the UE (100), when the UE (100) is in the switched ON. The UE (100) is configured to determine whether at least one of: the MS is registered via the non-3GPP access connected to a 5GCN, the registered PLMN has stopped broadcasting the disaster related indication, the registered PLMN has stopped broadcasting the PLMN with the disaster condition, and another PLMN is available and provides a normal service to the UE (100) after the UE (100) is switched ON. The UE (100) is configured to ignore the registered PLMN for PLMN selection and select next higher priority PLMN available as the candidate for PLMN selection based on the determination.

In another embodiment, the UE (100) is configured to detect that the disaster condition has ended, on one of the network entity (300) stopping broadcast of the disaster related indication, the network entity (300) stopping broadcast of the PLMN with the disaster condition, the MS registered via a non-3GPP access connected to the 5GCN, and another PLMN available and providing a normal service to the UE (100). Further, the UE (100) is configured to perform the PLMN selection procedure to search the PLMN based on the detection.

In an embodiment, at switch on, if the RPLMN is a PLMN with which the UE (100) was registered for disaster roaming and the UE (100) is registered via non-3GPP access connected to the 5GCN or an NG-RAN cell of the RPLMN broadcasts neither the disaster related indication nor a "list of one or more PLMN(s) with disaster condition for which disaster roaming is offered by the available PLMN" including the determined PLMN with Disaster Condition or an allowable PLMN is available then the UE (100) will ignore RPLMN and its equivalent PLMN.

In an embodiment, when the UE (100) detects that a disaster condition is no longer applicable, the UE (100) performs PLMN selection as described in TS 23.122 and TS 24.501 and may return to the PLMN previously with the disaster condition.

Figure 3B:
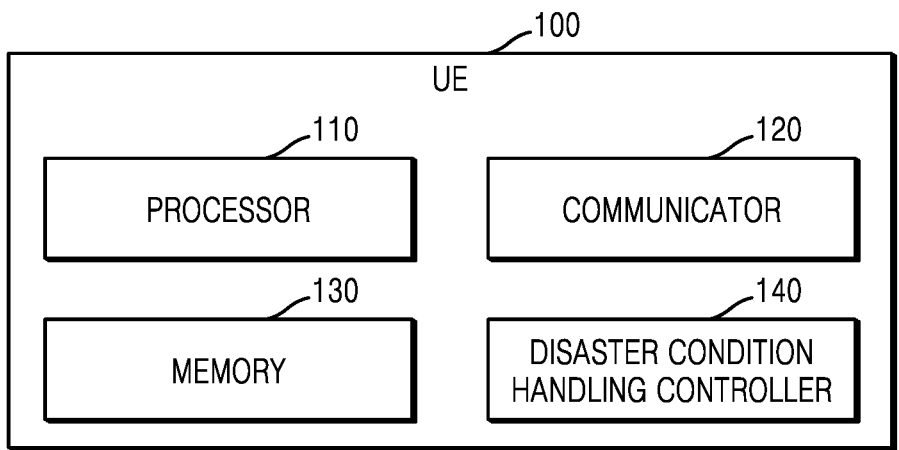
FIG. 3B shows various hardware components of a UE, according to an embodiment of the disclosure.

FIG. 3B shows various hardware components of the UE (100), according to an embodiment of the disclosure.

In an embodiment, the UE (100) includes a processor (110), a communicator (120), a memory (130), and a disaster condition handling controller (140). The processor (110) is coupled with the communicator (120), the memory (130), and the disaster condition handling controller (140).

In an embodiment, the disaster condition handling controller (140) is configured to mark with the disaster related indication that the registered PLMN is providing the disaster roaming service to the UE (100), when the UE (100) is switched OFF. Further, the disaster condition handling controller (140) is configured to determine whether the registered PLMN is the PLMN providing the disaster roaming service to the UE (100), when the UE (100) is in the switched ON. The disaster condition handling controller (140) is configured to determine whether at least one of: the MS is registered via the non-3GPP access connected to a 5GCN, the registered PLMN has stopped broadcasting the disaster related indication, the registered PLMN has stopped broadcasting the PLMN with the disaster condition, and another PLMN is available and provides a normal service to the UE (100) after the UE (100) is switched ON. The disaster condition handling controller (140) is configured to ignore the registered PLMN for PLMN selection and select next higher priority PLMN available as the candidate for PLMN selection based on the determination.

In another embodiment, the disaster condition handling controller (140) is configured to detect that the disaster condition has ended, on one of the network entity (300) stopping broadcast of the disaster related indication, the network entity (300) stopping broadcast of the PLMN with the disaster condition, the MS registered via a non-3GPP access connected to the 5GCN, and another PLMN available and providing a normal service to the UE (100). Further, the disaster condition handling controller (140) is configured to perform the PLMN selection procedure to search the PLMN based on the detection.

The disaster condition handling controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 3B shows various hardware components of the UE (100) but it is to be understood that other embodiments are not limited thereon. In other embodiments, the UE (100) may include less or greater number of components. Further, the labels or names of the components are used only for illustrative purpose and does not limit the scope of the disclosure. One or more components can be combined together to perform same or substantially similar function in the UE (100).

Figure 3C:
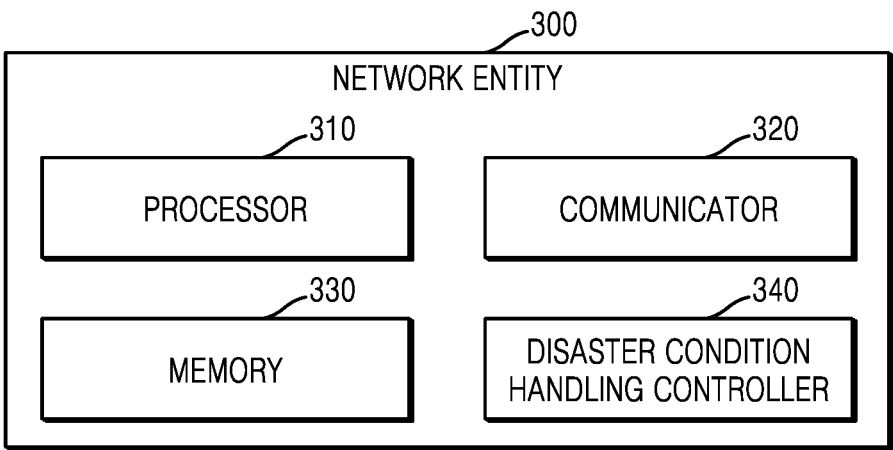
FIG. 3C shows various hardware components of a network entity, according to an embodiment of the disclosure.

FIG. 3C shows various hardware components of the network entity (300), according to an embodiment of the disclosure.

In an embodiment, the network entity (300) includes a processor (310), a communicator (320), a memory (330), and a disaster condition handling controller (340). The processor (310) is coupled with the communicator (320), the memory (330), and the disaster condition handling controller (340).

The disaster condition handling controller (340) is configured to detect that the disaster condition has ended and stop the broadcasting about the disaster related indication and broadcasting of the PLMN with the disaster condition.

The disaster condition handling controller (340) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (310). The processor (310) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 3C shows various hardware components of the network entity (300) but it is to be understood that other embodiments are not limited thereon. In other embodiments, the network entity (300) may include less or more number of components. Further, the labels or names of the components are used only for illustrative purpose and does not limit the scope of the disclosure. One or more components can be combined together to perform same or substantially similar function in the network entity (300).

FIGS. 4 and 5 are flowcharts (400 and 500) illustrating a method, implemented by the UE (100), for handling PLMN selection during the disaster condition, according to various embodiments of the disclosure.

Referring to FIG. 4, the operations 402 to 408 are performed by the disaster condition handling controller (140). At operation 402, the method includes marking with the disaster related indication that the registered PLMN is providing the disaster roaming service to the UE (100), when the UE (100) is switched OFF. At operation 404, the method includes determine whether the registered PLMN is the PLMN providing the disaster roaming service to the UE (100), when the UE (100) is in the switched ON. At operation 406, the method includes determine whether at least one of: a MS is registered via the non-3GPP access connected to a 5GCN, the registered PLMN has stopped broadcasting the disaster related indication, the registered PLMN has stopped broadcasting the PLMN with the disaster condition, and another PLMN is available and provides a normal service to the UE (100) after the UE (100) is switched ON. At operation 408, the method includes ignoring the registered PLMN for PLMN selection and select next higher priority PLMN available as the candidate for PLMN selection based on the determination.

Referring to FIG. 5, the operations 502 and 504 are performed by the disaster condition handling controller (140). At operation 502, the method includes detecting that the disaster condition has ended, on one of: the network entity (300) stopping broadcast of the disaster related indication, the network entity (300) stopping broadcast of the PLMN with the disaster condition, the MS registered via the non-3GPP access connected to the 5GCN, and another PLMN available and providing a normal service to the UE (100). At operation 504, the method includes performing the PLMN selection procedure to search the PLMN based on the detection.

The proposed method can be used to ignore the RPLMN and quick search of PLMN with the disaster condition.

FIG. 6 is a flowchart (600) illustrating a method, implemented by the network entity (300), for handling PLMN selection during the disaster condition, according to an embodiment of the disclosure.

Referring to FIG. 6, the operations 602 and 604 are performed by the disaster condition handling controller (340). At operation 602, the method includes detecting that the disaster condition has ended. At operation 604, the method includes stopping at least one of the broadcasting about the disaster related indication and broadcasting of the PLMN with the disaster condition.

Figure 7:
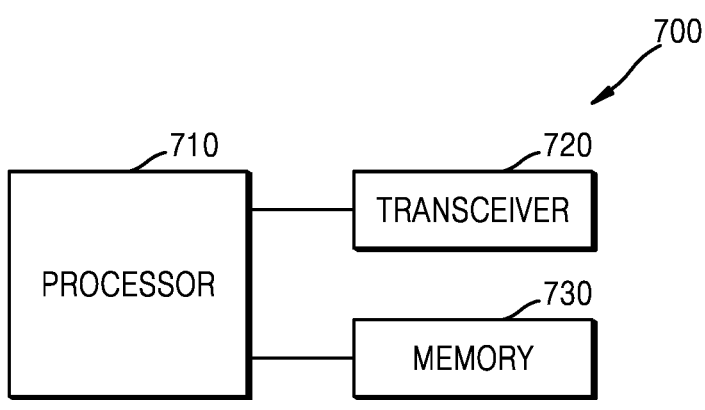
FIG. 7 is a diagram illustrating a user equipment according to an embodiment of the disclosure.

FIG. 7 is a diagram illustrating a user equipment according to an embodiment of the disclosure.

Referring to FIG. 7, the UE 700 may include a processor 710, a transceiver 720 and a memory 730. However, all of the illustrated components are not essential. The UE 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the UE 700 may be implemented by the processor 710.

The transceiver 720 may be connected to the processor 710 and transmit and/or receive a signal. In addition, the transceiver 720 may receive the signal through a wireless channel and output the signal to the processor 710. The transceiver 720 may transmit the signal output from the processor 710 through the wireless channel.

The memory 730 may store the control information or the data included in a signal obtained by the UE 700. The memory 730 may be connected to the processor 310 and store at least one instruction or a protocol or a parameter for the proposed function, process, and/or method. The memory 730 may include read-only memory (ROM) and/or random access memory (RAM) and/or hard disk and/or compact (CD)-ROM and/or digital versatile disc (DVD) and/or other storage devices.

Figure 8:
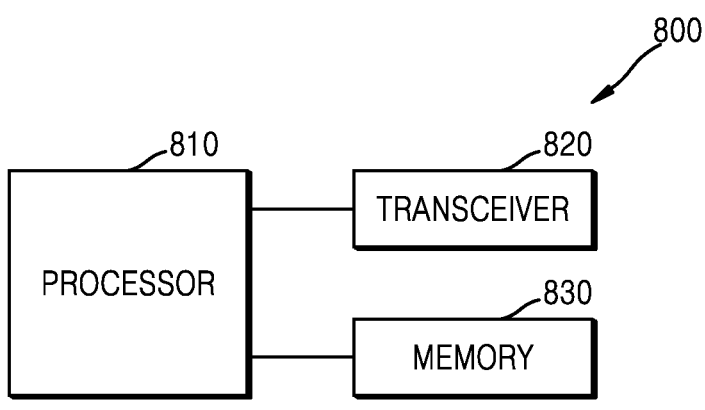
FIG. 8 is a diagram illustrating a core network entity according to an embodiment of the disclosure.

FIG. 8 is a diagram illustrating a core network entity according to an embodiment of the disclosure.

The core network may correspond to network entity (300) as described above.

Referring to FIG. 8, the core network entity 800 may include a processor 810, a transceiver 820 and a memory 830. However, all of the illustrated components are not essential. The core network entity 800 may be implemented by more or less components than those illustrated in FIG. 8. In addition, the processor 810 and the transceiver 820 and the memory 830 may be implemented as a single chip according to another embodiment.

The aforementioned components will now be described in detail.

The transceiver 820 may provide an interface for performing communication with other devices in a network. That is, the transceiver 820 may convert a bitstream transmitted from the core network entity 800 to other devices to a physical signal and covert a physical signal received from other devices to a bitstream. That is, the transceiver 820 may transmit and receive a signal. The transceiver 820 may be referred to as modem, transmitter, receiver, communication unit and communication module. The transceiver 820 may enable the core network entity 800 to communicate with other devices or system through backhaul connection or other connection method.

The memory 830 may store a basic program, an application program, configuration information for an operation of the core network entity 800. The memory 830 may include volatile memory, non-volatile memory and a combination of the volatile memory and the non-volatile memory. The memory 830 may provide data according to a request from the processor 810.

The processor 810 may control overall operations of the core network entity 800. For example, the processor 810 may transmit and receive a signal through the transceiver 820. The processor 810 may include at least one processor. The processor 810 may control the core network entity 800 to perform operations according to embodiments of the disclosure.

In accordance with an embodiment of the disclosure, a method for handling Public Land Mobile Network (PLMN) selection during a disaster condition is provided. The method may comprise: marking, by a User Equipment (UE) (100), with a disaster related indication that a registered PLMN is providing a disaster roaming service to the UE (100), when the UE (100) is switched OFF; determining, by the UE (100), whether the registered PLMN is a PLMN providing the disaster roaming service to the UE (100), when the UE (100) is switched ON; determining, by the UE (100), at least one of: a mobile station (MS) is registered via a non-3rd Generation Partnership Project (3GPP) access connected to a fifth generation core network (5GCN); the registered PLMN has stopped broadcasting the disaster related indication; the registered PLMN has stopped broadcasting a PLMN with the disaster condition; and another PLMN is available and provides a normal service to the UE (100) after the UE (100) is switched ON; and ignoring, by the UE (100), the registered PLMN for PLMN selection and selecting next higher priority PLMN available as a candidate for PLMN selection based on the determination.

In accordance with an embodiment of the disclosure, a method for handling a Public Land Mobile Network (PLMN) selection during a disaster condition is provided. The method may comprise: detecting, by a User Equipment (UE) (100), that the disaster condition has ended, based on one of: a network entity (300) stopping broadcast of a disaster related indication; the network entity (300) stopping broadcast of a PLMN with disaster condition; a mobile station (MS) registered via a non-3rd Generation Partnership Project (3GPP) access connected to a fifth generation core network (5GCN); and another PLMN available and providing a normal service to the UE (100); and performing, by the UE (100), a PLMN selection procedure to search a PLMN based on the detection.

In accordance with an embodiment of the disclosure, a method for handling a Public Land Mobile Network (PLMN) selection during a disaster condition is provided. The method may comprise: detecting, by a network entity (300), that the disaster condition has ended; and stopping, by the network entity (300), at least one of a broadcasting about a disaster related indication and broadcasting of a PLMN with the disaster condition.

A User Equipment (UE) (100) for handling Public Land Mobile Network (PLMN) selection during a disaster condition is provided. The UE (100) may comprise: a processor (110); a memory (130); and a disaster condition handling controller (140), coupled with the processor (110) and the memory (130), configured to: mark with a disaster related indication that a registered PLMN is providing a disaster roaming service to the UE (100), when the UE (100) is switched OFF; determine whether the registered PLMN is a PLMN providing the disaster roaming service to the UE (100), when the UE (100) is switched ON; determine at least one of: a mobile station (MS) is registered via a non-3rd Generation Partnership Project (3GPP) access connected to a fifth generation core network (5GCN); the registered PLMN has stopped broadcasting the disaster related indication; the registered PLMN has stopped broadcasting a PLMN with the disaster condition; and another PLMN is available and provides a normal service to the UE (100) after the UE (100) is switched ON; and ignore the registered PLMN for PLMN selection and select next higher priority PLMN available as a candidate for PLMN selection based on the determination.

In accordance with an embodiment of the disclosure, a User Equipment (UE) (100) for handling a Public Land Mobile Network (PLMN) selection during a disaster condition is provided. The UE (100) may comprise: a processor (110); a memory (130); and a disaster condition handling controller (140), coupled with the processor (110) and the memory (130), configured to: detect that the disaster condition has ended, based on one of: a network entity (300)

stopping broadcast of a disaster related indication, the network entity (300) stopping broadcast of a PLMN with disaster condition, a mobile station (MS) registered via a non-3rd Generation Partnership Project (3GPP) access connected to a fifth generation core network (5GCN), and another PLMN available and providing a normal service to the UE (100); and perform a PLMN selection procedure to search a PLMN based on the detection.

In accordance with an embodiment of the disclosure, a network entity (300) for handling a Public Land Mobile Network (PLMN) selection during a disaster condition, the network entity (300) comprising: a processor (310); a memory (330); and a disaster condition handling controller (340), coupled with the processor (310) and the memory (330), configured to: detect that the disaster condition has ended; and stop at least one of a broadcasting about a disaster related indication and broadcasting of a PLMN with the disaster condition.

In accordance with an embodiment of the disclosure, a method performed by a user equipment (UE) in a wireless communication system is provided. The method may comprise: at switch-on or recovery from a lack of a coverage, identifying that a registered public land mobile network (PLMN) is a PLMN with which the UE is registered for a disaster roaming; and performing a PLMN selection procedure, based on the identification, wherein the registered PLMN is ignored during the PLMN selection procedure.

In an embodiment, the registered PLMN is ignored in case that a cell of the registered PLMN stops broadcasting a disaster related indication.

In an embodiment, wherein the broadcasting of the disaster related indication is stopped when a disaster condition is no longer applicable.

In an embodiment, the PLMN selection is performed when the disaster condition is no longer applicable.

In an embodiment, the registered PLMN is ignored in case that a cell of the registered PLMN stops broadcasting information associated with a PLMN with a disaster condition, and wherein the broadcasting of the information associated with the PLMN with the disaster condition is stopped when the disaster condition is no longer applicable.

In an embodiment, the registered PLMN is ignored in case that an allowable PLMN is available.

In an embodiment, the registered PLMN is ignored in case that the UE is registered to a network via non-3rd generation partnership project (3GPP) access.

In an embodiment, the PLMN selection is performed based on priorities of PLMNs.

In accordance with an embodiment of the disclosure, a user equipment (UE) in a wireless communication system, the UE comprising: a transceiver; and at least one processor coupled to the transceiver and configured to: at switch-on or recovery from a lack of a coverage, identify that a registered public land mobile network (PLMN) is a PLMN with which the UE is registered for a disaster roaming; and perform a PLMN selection procedure, based on the identification, wherein the registered PLMN is ignored during the PLMN selection procedure.

In an embodiment, the registered PLMN is ignored in case that a cell of the registered PLMN stops broadcasting a disaster related indication.

In an embodiment, the broadcasting of the disaster related indication is stopped when a disaster condition is no longer applicable.

In an embodiment, the PLMN selection is performed when the disaster condition is no longer applicable.

In an embodiment, the registered PLMN is ignored in case that a cell of the registered PLMN stops broadcasting information associated with a PLMN with a disaster condition, and wherein the broadcasting of the information associated with the PLMN with the disaster condition is stopped when the disaster condition is no longer applicable.

In an embodiment, the registered PLMN is ignored in case that an allowable PLMN is available.

The various actions, acts, blocks, steps, or the like in the flowcharts (400-600) may be performed in the order presented, in a different order or simultaneously. Further, in some embodiments, some of the actions, acts, blocks, steps, or the like may be omitted, added, modified, skipped, or the like without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

performing a procedure associated with registering the UE with a first public land mobile network (PLMN) for a disaster roaming, wherein the first PLMN provides a disaster roaming service related to a second PLMN with a disaster condition;

at switch-on or recovery from a lack of coverage, identifying whether a registered PLMN is the first PLMN with which the UE was registered for the disaster roaming before the switch-on or the recovery from the lack of the coverage; and performing a PLMN selection procedure, based on the identification, wherein, in case that the registered PLMN is the first PLMN with which the UE was registered for the disaster roaming before the switch-on or the recovery from the lack of coverage, and that the UE is registered via non-3$^{rd}$ generation partnership project (3GPP) access to a network, or a cell of the registered PLMN broadcasts neither a disaster related indication nor information associated with the second PLMN with the disaster condition or an allowable PLMN is available, the registered PLMN is ignored during the PLMN selection procedure.

2. The method of claim 1, wherein a broadcasting of the disaster related indication is stopped when the disaster condition is no longer applicable.

3. The method of claim 2, wherein the PLMN selection procedure is performed when the disaster condition is no longer applicable.

4. The method of claim 1, wherein a broadcasting of the information associated with the second PLMN with the disaster condition is stopped when the disaster condition is no longer applicable.

5. The method of claim 1, wherein the PLMN selection procedure is performed based on priorities of PLMNs.

6. A user equipment (UE) in a wireless communication system, the UE comprising:

at least one transceiver;

at least one processor communicatively coupled to the at least one transceiver; and at least one memory, communicatively coupled to the at least one processor, storing instructions executable by the at least one processor to cause the UE to:

perform a procedure associated with registering the UE with a first public land mobile network (PLMN) for a disaster roaming, wherein the first PLMN provides a disaster roaming service related to a second PLMN with a disaster condition, at switch-on or recovery from a lack of coverage, identify whether a registered PLMN is the first PLMN with which the UE was registered for the disaster roaming before the switch-on or the recovery from the lack of the coverage, and perform a PLMN selection procedure, based on the identification, wherein, in case that the registered PLMN is the first PLMN with which the UE was registered for the disaster roaming before the switch-on or the recovery from the lack of coverage, and that the UE is registered via non-3$^{rd}$ generation partnership project (3GPP) access to a network, or a cell of the registered PLMN broadcasts neither a disaster related indication nor information associated with the second PLMN with the disaster condition or an allowable PLMN is available, the registered PLMN is ignored during the PLMN selection procedure.

7. The UE of claim 6, wherein a broadcasting of the disaster related indication is stopped when the disaster condition is no longer applicable.

8. The UE of claim 7, wherein the PLMN selection procedure is performed when the disaster condition is no longer applicable.

9. The UE of claim 6, wherein a broadcasting of the information associated with the second PLMN with the disaster condition is stopped when the disaster condition is no longer applicable.

10. One or more non-transitory computer-readable storage media storing computer-executable instructions, when executed by at least one processor of a user equipment (UE), cause the UE to perform operations, the operations comprising:

performing a procedure associated with registering the UE with a first public land mobile network (PLMN) for disaster roaming, wherein the first PLMN provides a disaster roaming service related to a second PLMN with a disaster condition;

at switch-on or recovery from a lack of coverage, identifying whether a registered PLMN is the first PLMN with which the UE was registered for the disaster roaming before the switch-on or the recovery from the lack of the coverage; and performing a PLMN selection procedure, based on the identification, wherein, in case that the registered PLMN is the first PLMN with which the UE was registered for the disaster roaming before the switch-on or the recovery from the lack of coverage, and that the UE is registered via non-3$^{rd}$ generation partnership project (3GPP) access to a network, or a cell of the registered PLMN broadcasts neither a disaster related indication nor information associated with the second PLMN with the disaster condition or an allowable PLMN is available, the registered PLMN is ignored during the PLMN selection procedure.

* * * * *